US010014995B2

(12) United States Patent
Dai

(10) Patent No.: US 10,014,995 B2
(45) Date of Patent: Jul. 3, 2018

(54) DATA TRANSMISSION METHOD, DATA RECEPTION AND DETECTION METHOD, BASE STATION AND USER EQUIPMENT

(71) Applicant: CHINA ACADEMY OF TELECOMMUNICATIONS TECHNOLOGY, Beijing (CN)

(72) Inventor: Xiaoming Dai, Beijing (CN)

(73) Assignee: China Academy Of Telecommunications Technology, Beijing (CN)

( * ) Notice: Subject to any disclaimer, the term of this patent is extended or adjusted under 35 U.S.C. 154(b) by 191 days.

(21) Appl. No.: 15/111,467

(22) PCT Filed: Jan. 21, 2015

(86) PCT No.: PCT/CN2015/071217

§ 371 (c)(1),
(2) Date: Jul. 13, 2016

(87) PCT Pub. No.: WO2015/110008

PCT Pub. Date: Jul. 30, 2015

(65) Prior Publication Data

US 2016/0344522 A1 Nov. 24, 2016

(30) Foreign Application Priority Data

Jan. 22, 2014 (CN) .......................... 2014 1 0030862

(51) Int. Cl.
*H04L 5/00* (2006.01)
*H04L 1/18* (2006.01)

(52) U.S. Cl.
CPC .......... *H04L 5/0044* (2013.01); *H04L 1/1861* (2013.01); *H04L 1/1893* (2013.01); *H04L 5/0016* (2013.01); *H04L 5/0023* (2013.01)

(58) Field of Classification Search
CPC ... H04L 5/0044; H04L 1/1861; H04L 1/1893; H04L 5/0016; H04L 5/0023;
(Continued)

(56) References Cited

U.S. PATENT DOCUMENTS 9,820,209 B1 * 11/2017 Agee .................... H04W 40/04
2009/0323602 A1 * 12/2009 Li .......................... H04L 47/14 370/329

(Continued)

FOREIGN PATENT DOCUMENTS

CN 101772039 7/2010
CN 102036402 4/2011

(Continued)

OTHER PUBLICATIONS

Written Opinion of the International Search Authority for PCT/CN2015/071217 dated May 6, 2015 and its English translation provided by WIPO.

(Continued)

*Primary Examiner* — Kwang B Yao
*Assistant Examiner* — Hardikkumar Patel
(74) *Attorney, Agent, or Firm* — Ladas & Parry, LLP

(57) ABSTRACT

The present disclosure relates to the field of communication technology, and provides a data transmission method, a data reception and detection method, a base station and a UE on the basis of a non-orthogonal mode. Before the transmission of pieces of data on physical resources by the base station, a plurality of pieces of data is firstly mapped to the physical resources at an amount not greater than the number of the pieces of data, each piece of data in the plurality of pieces of data is mapped to at least one physical resource, and the number of the physical resources to which each piece of data is mapped is not completely the same. Then, the pieces of data on the physical resources are transmitted by the base (Continued)

station. According to the present disclosure, it is able to transmit more pieces of data through fewer physical resources, thereby to improve the data transmission capability for the communication system.

22 Claims, 6 Drawing Sheets

(58) Field of Classification Search
CPC ... H04L 5/0051; H04L 25/0228; H04B 7/216; H04B 7/212; H04B 1/707; H04J 13/004; G06F 9/355; G06F 11/36; G06F 15/78; G06F 15/76; G06F 9/38; G06F 9/30; G06F 9/318; G06F 9/34
See application file for complete search history.

(56) References Cited

U.S. PATENT DOCUMENTS

| | | | | |
|---|---|---|---|---|
| 2010/0098042 | A1* | 4/2010 | Dent | H04B 1/707 370/342 |
| 2014/0029562 | A1 | 1/2014 | Kishiyama | |
| 2014/0050279 | A1 | 2/2014 | Kishiyama | |
| 2015/0171983 | A1 | 6/2015 | Kusashima | |

FOREIGN PATENT DOCUMENTS

| | | | |
|---|---|---|---|
| CN | 102299728 | | 12/2011 |
| CN | 103378885 | A | 10/2013 |
| CN | 103518339 | | 1/2014 |
| EP | 2712105 | A1 | 3/2014 |
| EP | 2858281 | A1 | 4/2015 |
| JP | 2013009289 | A | 1/2013 |
| JP | 2013009291 | A | 1/2013 |
| JP | 2013247513 | A | 12/2013 |
| WO | 2010046748 | A2 | 4/2010 |
| WO | 2012161080 | | 11/2012 |
| WO | 2013176042 | | 11/2013 |

OTHER PUBLICATIONS

First Office Action for Chinese application No. 201410030862.9 dated Aug. 18, 2017 and search report, with machine English translation.

Office Action for European Patent application No. 15740127 completed on Jul. 17, 2017.

Office Action for Japanese Patent application No. 2016-547590 dated Jun. 6, 2017 and search report, with machine English translation.

Office Action for Korean Patent application No. 10-2016-7019606 dated Aug. 11, 2017 and search report, with machine English translation.

Office Action for Taiwanese Patent application No. 104101747 dated Apr. 22, 2017 and search report, with machine English translation.

Office Action for Taiwanese Patent application No. 104101747 dated Apr. 22, 2016 and search report, with machine English translation.

International Search Report for PCT/ /CN2015/071217 dated May 6, 2015 and its English translation provided by WIPO.

Written Opinion of the International Search Authority dated May 6, 2015 and its English translation provided by Google Translate.

* cited by examiner

DATA TRANSMISSION METHOD, DATA RECEPTION AND DETECTION METHOD, BASE STATION AND USER EQUIPMENT

CROSS-REFERENCE TO RELATED APPLICATION

The present-application is the U.S. national phase of PCT Application No. PCT/CN2015/071217 filed on Jan. 21, 2015, which claims a priority of the Chinese patent application No. 201410030862.9 filed on Jan. 22, 2014 and entitled "data transmission method, data reception and detection method, base station and user equipment", the disclosures of which are incorporated herein by reference in their entireties.

TECHNICAL FIELD

The present disclosure relates to the field of communication technology, in particular to a data transmission method, a data reception and detection method, a base station and a user equipment (UE).

BACKGROUND

A 4$^{th}$-Generation (4G) system is designed on the basis of a linear receiver and orthogonal transmission. The linear receiver may be implemented conveniently while ensuring the system performance, and the orthogonal transmission may be used to simplify the implementation of a receiving end. FIG. 1 is a schematic view showing data transmission on the basis of an orthogonal design, where a plurality of different pieces of data is transmitted on orthogonal physical resources respectively, and each piece of data is transmitted on a corresponding one physical resource. All the pieces of data are orthogonal to each other, so no interference occurs among them.

Due to the limited radio resources, it is impossible for the orthogonal system to provide system capacity for multi-user transmission. The data transmission on the basis of the orthogonal design has a defect of small system capacity, i.e., the data transmission capability for the system is relatively low.

Currently, NTT DoCoMo has proposed in WO2012161080 a non-orthogonal multi-address access approach on the basis of energy distribution, which may provide performance gains as compared with the orthogonal system. However, due to restriction on the degree of freedom for the energy distribution, its system capacity is still insufficient, and the data transmission capability is still low.

SUMMARY

An object of the present disclosure is to provide a data transmission method, a data reception and detection method, a base station and a UE on the basis of a non-orthogonal mode, so as to improve the data transmission capability for a communication system.

In one aspect, the present disclosure provides in some embodiments a data transmission method, including steps of: mapping a plurality of pieces of data to physical resources at an amount not greater than the number of the pieces of data, each piece of data in the plurality of pieces of data being mapped to at least one physical resource, the number of the physical resources to which each piece of data is mapped being not completely the same; and transmitting the plurality of pieces of data on the physical resources.

Because the number of the physical resources on which the pieces of data are transmitted is smaller than the number of the pieces of data, so it is able to improve the data transmission capability for the communication system.

Alternatively, the number of the pieces of data mapped to each physical resource is not greater than the number of the physical resources, so as to prevent the waste of resources.

Alternatively, the pieces of data mapped to an identical physical resource are superposed and then transmitted on the physical resource.

Alternatively, the pieces of data are superposed linearly.

Alternatively, the plurality of pieces of data are divided into a plurality of layers, the number of the physical resources to which each piece of data in a previous layer is mapped is greater than the number of the physical resources to which each piece of data in a current layer is mapped, the pieces of data which are in the layers of an identical type and belong to different users are superposed to the minimum degree, and the layers of different types are subjected to pattern maximization treatment.

Alternatively, the data transmission method further includes subjecting the layers of an identical type which have different equivalent spreading factors to pattern maximization treatment, and subjecting the layers of an identical type which have an identical equivalent spreading factor to interference minimization treatment.

Alternatively, the number of the physical resources to which any one of the pieces of data in an identical layer is mapped is the same as the number of the physical resources to which any other one of the pieces of data in the identical layer is mapped.

Alternatively, the plurality of pieces of data belongs to at least two users.

In another aspect, the present disclosure provides in some embodiments a data reception and detection method, including steps of: receiving, by a UE, a plurality of pieces of data on a plurality of physical resources from a base station; and carrying out, by the UE, demodulation detection in accordance with a mapping mode of the plurality of pieces of data to the plurality of physical resources, the number of the pieces of data mapped to the plurality of physical resources being not less than the number of the physical resources, each piece of data in the plurality of pieces of data being mapped to at least one physical resource, the number of the physical resources to which each piece of data is mapped being not completely the same.

Because the number of the physical resources on which the pieces of data are transmitted is smaller than the number of the pieces of data, so it is able to improve the data transmission capability for the communication system.

Alternatively, the number of the pieces of data mapped to each physical resource is not greater than the number of the physical resources, so as to prevent the waste of resources.

Alternatively, the pieces of data mapped to an identical physical resource are superposed and then transmitted on the physical resource.

Alternatively, the pieces of data are superposed linearly.

Alternatively, the plurality of pieces of data is divided into a plurality of layers, the number of the physical resources to which each piece of data in a previous layer is mapped is greater than the number of the physical resources to which each piece of data in a current layer is mapped, the pieces of data which are in the layers of an identical type and belong to different users are superposed to the minimum degree, and the layers of different types are subjected to pattern maximization treatment.

Alternatively, the data reception and detection method further includes subjecting the layers of an identical type which have different equivalent spreading factors to pattern maximization treatment, and subjecting the layers of an identical type which have an identical equivalent spreading factor to interference minimization treatment.

Alternatively, the number of the physical resources to which any one of the pieces of data in an identical layer is mapped is the same as the number of the physical resources to which any other one of the pieces of data in the identical layer is mapped.

Alternatively, the plurality of pieces of data belongs to at least two users, and the UE acquires its own data after the demodulation detection.

Alternatively, the UE carries out the demodulation detection in a successive interference cancellation mode.

Alternatively, the UE preferentially detects the data in the layer where the number of the physical resources to which each data is mapped is large.

In yet another aspect, the present disclosure provides in some embodiments a base station, including: a mapping unit configured to map a plurality of pieces of data to physical resources at an amount not greater than the number of the pieces of data, each piece of data in the plurality of pieces of data being mapped to at least one physical resource, the number of the physical resources to which each piece of data is mapped being not completely the same; and a transmission unit configured to transmit the plurality of pieces of data on the physical resources.

Because the number of the physical resources on which the pieces of data are transmitted is smaller than the number of the pieces of data, so it is able to improve the data transmission capability for the communication system.

Alternatively, the number of the pieces of data mapped to each physical resource is not greater than the number of the physical resources, so as to prevent the waste of resources.

Alternatively, the pieces of data mapped to an identical physical resource are superposed and then transmitted on the physical resource.

Alternatively, the pieces of data are superposed linearly.

Alternatively, the plurality of pieces of data is divided into a plurality of layers, the number of the physical resources to which each piece of data in a previous layer is mapped is greater than the number of the physical resources to which each piece of data in a current layer is mapped, the pieces of data which are in the layers of an identical type and belong to different users are superposed to the minimum degree, and the layers of different types are subjected to pattern maximization treatment.

Alternatively, the layers of an identical type which have different equivalent spreading factors are subjected to pattern maximization treatment, and the layers of an identical type which have an identical equivalent spreading factor are subjected to interference minimization treatment.

Alternatively, the number of the physical resources to which any one of the pieces of data in an identical layer is mapped is the same as the number of the physical resources to which any other one of the pieces of data in the identical layer is mapped.

Alternatively, the plurality of pieces of data belongs to at least two users.

In still yet another aspect, the present disclosure provides in some embodiments a UE, including: a reception unit configured to receive a plurality of pieces of data on a plurality of physical resources from a base station; and a demodulation unit configured to carry out demodulation detection in accordance with a mapping mode of the plurality of pieces of data to the plurality of physical resources, the number of the pieces of data mapped to the plurality of physical resources being not less than the number of the physical resources, each piece of data in the plurality of pieces of data being mapped to at least one physical resource, the number of the physical resources to which each piece of data is mapped being not completely the same.

Because the number of the physical resources on which the pieces of data are transmitted is smaller than the number of the pieces of data, so it is able to improve the data transmission capability for the communication system.

Alternatively, the number of the pieces of data mapped to each physical resource is not greater than the number of the physical resources, so as to prevent the waste of resources.

Alternatively, the pieces of data mapped to an identical physical resource are superposed and then transmitted on the physical resource.

Alternatively, the pieces of data are superposed linearly.

Alternatively, the plurality of pieces of data is divided into a plurality of layers, the number of the physical resources to which each piece of data in a previous layer is mapped is greater than the number of the physical resources to which each piece of data in a current layer is mapped, the pieces of data which are in the layers of an identical type and belong to different users are superposed to the minimum degree, and the layers of different types are subjected to pattern maximization treatment.

Alternatively, the layers of an identical type which have different equivalent spreading factors are subjected to pattern maximization treatment, and the layers of an identical type which have an identical equivalent spreading factor are subjected to interference minimization treatment.

Alternatively, the number of the physical resources to which any one of the pieces of data in an identical layer is mapped is the same as the number of the physical resources to which any other one of the pieces of data in the identical layer is mapped.

Alternatively, the plurality of pieces of data belongs to at least two users, and the UE acquires its own data after the demodulation detection.

Alternatively, the UE carries out the demodulation detection in a successive interference cancellation mode.

Alternatively, the UE preferentially detects the data in the layer where the number of the physical resources to which each data is mapped is large.

In still yet another aspect, the present disclosure provides in some embodiments a base station, including: a processor configured to read a program stored in a memory so as to map a plurality of pieces of data to physical resources at an amount not greater than the number of the pieces of data, and transmit the plurality of pieces of data on the physical resources by a transceiver, each piece of data in the plurality of pieces of data being mapped to at least one physical resource, the number of the physical resources to which each piece of data is mapped being not completely the same; and the transceiver configured to receive and transmit the data under the control of the processor.

Because the number of the physical resources on which the pieces of data are transmitted is smaller than the number of the pieces of data, so it is able to improve the data transmission capability for the communication system.

Alternatively, the number of the pieces of data mapped to each physical resource is not greater than the number of the physical resources, so as to prevent the waste of resources.

Alternatively, the transceiver is further configured to superpose and transmit the pieces of data mapped to an identical physical resource.

Alternatively, the transceiver is further configured to superpose the pieces of data linearly.

Alternatively, the processor is further configured to divide the plurality of pieces of data into a plurality of layers, the number of the physical resources to which each piece of data in a previous layer is mapped is greater than the number of the physical resources to which each piece of data in a current layer is mapped, the pieces of data which are in the layers of an identical type and belong to different users are superposed to the minimum degree, and the layers of different types are subjected to pattern maximization treatment.

Alternatively, the layers of an identical type which have different equivalent spreading factors are subjected to pattern maximization treatment, and the layers of an identical type which have an identical equivalent spreading factor are subjected to interference minimization treatment.

Alternatively, the processor is further configured to map the pieces of data in an identical layer to the physical resources at an identical amount.

Alternatively, the plurality of pieces of data belongs to at least two users.

In still yet another aspect, the present disclosure provides in some embodiments a UE, including: a transceiver configured to receive and transmit data under the control of a processor; and the processor configured to read a program stored in a memory so as to receive, by the transceiver, a plurality of pieces of data on a plurality of physical resources from a base station, and carry out demodulation detection in accordance with a mapping mode of the plurality of pieces of data to the plurality of physical resources, the number of the pieces of data mapped to the plurality of physical resources being not less than the number of the physical resources, each piece of data in the plurality of pieces of data being mapped to at least one physical resource, the number of the physical resources to which each piece of data is mapped being not completely the same.

Because the number of the physical resources on which the pieces of data are transmitted is smaller than the number of the pieces of data, so it is able to improve the data transmission capability for the communication system.

Alternatively, the number of the pieces of data mapped to each physical resource is not greater than the number of the physical resources, so as to prevent the waste of resources.

Alternatively, the pieces of data mapped to an identical physical resource are superposed and then transmitted on the physical resource.

Alternatively, the pieces of data are superposed linearly.

Alternatively, the plurality of pieces of data is divided into a plurality of layers, the number of the physical resources to which each piece of data in a previous layer is mapped is greater than the number of the physical resources to which each piece of data in a current layer is mapped, the pieces of data which are in the layers of an identical type and belong to different users are superposed to the minimum degree, and the layers of different types are subjected to pattern maximization treatment.

Alternatively, the layers of an identical type which have different equivalent spreading factors are subjected to pattern maximization treatment, and the layers of an identical type which have an identical equivalent spreading factor are subjected to interference minimization treatment.

Alternatively, the number of the physical resources to which any one of the pieces of data in an identical layer is mapped is the same as the number of the physical resources to which any other one of the pieces of data in the identical layer is mapped.

Alternatively, the plurality of pieces of data belongs to at least two users, and the transceiver acquires its own data after the demodulation detection.

Alternatively, the transceiver carries out the demodulation detection in a successive interference cancellation mode.

Alternatively, the processor preferentially detects the data in the layer where the number of the physical resources to which each data is mapped is large.

According to the data transmission method, the data reception and detection method, the base station and the UE on the basis of a non-orthogonal mode in the embodiments of the present disclosure, before the transmission of the pieces of data on the physical resources, the plurality of pieces of data is firstly mapped to the physical resources at an amount not greater than the number of the pieces of data, each piece of data in the plurality of pieces of data is mapped to at least one physical resource, and the number of the physical resources to which each piece of data is mapped is not completely the same. As a result, it is able to transmit more pieces of data through fewer physical resources, thereby to improve the data transmission capability for the communication system.

DETAILED DESCRIPTION OF THE EMBODIMENTS

Figure 1:
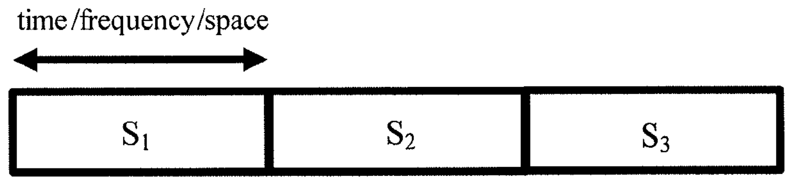
FIG. 1 is a schematic view showing the data transmission in an orthogonal mode in the prior art.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

It should be appreciated that, the present disclosure may be applied to various communication systems, e.g., a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, an Advanced Long Term Evolution (LTE-A) system, a Universal Mobile Telecommunication System (UMTS), and so on.

It should be further appreciated that, in the embodiments of the present disclosure, a UE may include, but not limited to, a Mobile Station (MS), a mobile terminal, a mobile telephone, a handset and a portable equipment. The UE may communicate with one or more core networks via a Radio Access Network (RAN). For example, the UE may be a mobile telephone (or a cellular phone), a computer having a function of radio communication, a portable, pocket-size or handheld device, a device built in a computer, or an on-vehicle device.

In the embodiments of the present disclosure, a base station (e.g., an access point) may refer to a device in an access network, which communicates with a radio terminal over an air interface through one or more sectors. The base station may be used to convert a received air frame from/to an Internet Protocol (IP) packet, and it functions as a router between the radio terminal and other parts of the access network, including an IP network. The base station may also be used coordinate the attribute management over the air interface. For example, the base station may be a Base Transceiver Station (BTS) for the GSM or CDMA system, a NodeB for the WCDMA system, or an evolved NodeB (eNB) for the LTE system, which are not particularly defined herein.

An object of the present disclosure is to provide a data transmission method, a data reception and detection method, a base station and a UE on the basis of a non-orthogonal mode. Before the transmission of a plurality of pieces of data on physical resources by the base station, the plurality of pieces of data is firstly mapped to the physical resources at an amount not greater than the number of the pieces of data, each piece of data in the plurality of pieces of data is mapped to at least one physical resource, and the number of the physical resources to which each piece of data is mapped is not completely the same. As a result, it is able to transmit more pieces of data through fewer physical resources, thereby to improve the data transmission capability for the communication system.

Figure 2:
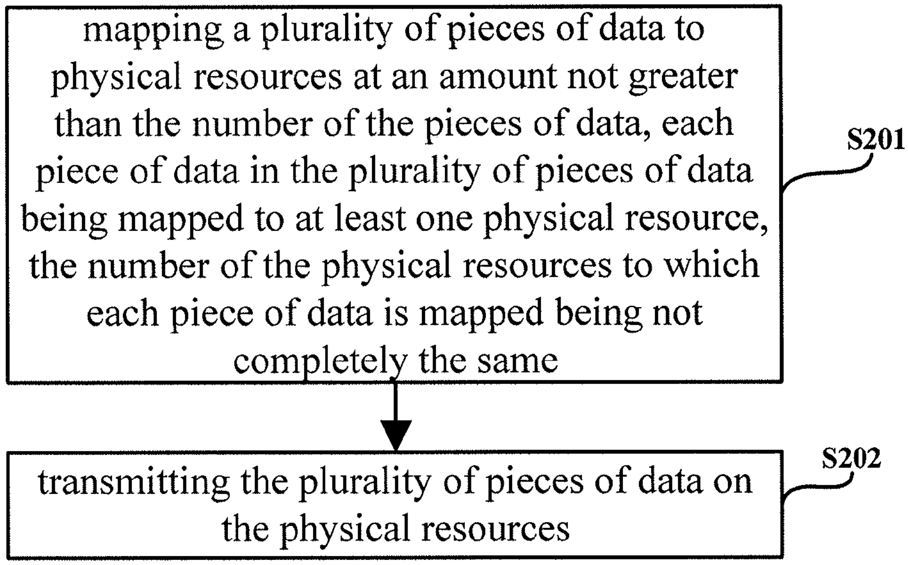
FIG. 2 is a flow chart of a data transmission method according to one embodiment of the present disclosure.

As shown in FIG. 2, the present disclosure provides in some embodiments a data transmission method, including: Step S201 of mapping a plurality of pieces of data to physical resources at an amount not greater than the number of the pieces of data, each piece of data in the plurality of pieces of data being mapped to at least one physical resource, the number of the physical resources to which each piece of data is mapped being not completely the same; and Step S202 of transmitting the plurality of pieces of data on the physical resources.

Because the number of the physical resources on which the pieces of data are transmitted is smaller than the number of the pieces of data, so it is able to improve the data transmission capability for the communication system.

Through power control, the number of the pieces of data to be transmitted on each physical resource may be greater than the number of the physical resources. However, in the embodiments of the present disclosure, the number of the pieces of data mapped to each physical resource is not greater than the number of the physical resources, so as to prevent the waste of resources.

Alternatively, the pieces of data mapped to an identical physical resource are transmitted on an identical physical resource in a superposed manner, i.e., the pieces of data mapped to an identical physical resource are superposed and then transmitted on the physical resource. Alternatively, the pieces of data are superposed linearly.

Alternatively, during the mapping, the plurality of pieces of data may be divided into a plurality of layers, and the number of the physical resources to which each piece of data in a previous layer is mapped is greater than the number of the physical resources to which each piece of data in a current layer is mapped. Further, the number of the physical resources to which any one of the pieces of data in an identical layer is mapped may be same as the number of the physical resources to which any other one of the pieces of data in the identical layer is mapped. Alternatively, the pieces of data which are in the layers of an identical type and belong to different users are overlapped to the minimum degree, and the layers of different types are subjected to pattern maximization treatment.

Alternatively, the layers of an identical type which have different equivalent spreading factors (i.e., the number of elements which is not 0) may be subjected to pattern maximization treatment, and the layers of an identical type which have an identical equivalent spreading factor may be subjected to interference minimization treatment.

The so-called pattern maximization treatment refers to the treatment for ensuring the maximum number of the layers of each type.

Based on the above-mentioned principle, in the case that N=2, N=3 and N=4, resultant system spreading matrices may be shown in the following equations:

$$B_{PDMA,2\times 3} = \begin{bmatrix} 1 & 1 & 0 \\ \underbrace{1}_{\binom{2}{2}=1} & \underbrace{0 \quad 1}_{\binom{2}{1}=2} \end{bmatrix},$$

$$B_{PDMA,3\times 7} = \begin{bmatrix} 1 & 1 & 0 & 1 & 1 & 0 & 0 \\ 1 & 1 & 1 & 0 & 0 & 1 & 0 \\ \underbrace{1}_{\binom{3}{3}=1} & \underbrace{0 \quad 1 \quad 1}_{\binom{3}{2}=3} & \underbrace{0 \quad 0 \quad 1}_{\binom{3}{1}=3} \end{bmatrix}, \text{ and}$$

$$B_{PDMA,4\times 15} = \begin{bmatrix} 1 & 1 & 0 & 1 & 1 & 1 & 1 & 1 & 0 & 0 & 0 & 1 & 0 & 0 & 0 \\ 1 & 1 & 1 & 0 & 1 & 1 & 0 & 0 & 1 & 1 & 0 & 0 & 1 & 0 & 0 \\ 1 & 1 & 1 & 1 & 0 & 0 & 1 & 0 & 1 & 0 & 1 & 0 & 0 & 1 & 0 \\ \underbrace{1}_{\binom{4}{4}=1} & \underbrace{0 \quad 1 \quad 1 \quad 1}_{\binom{4}{3}=4} & \underbrace{0 \quad 0 \quad 1 \quad 0 \quad 1 \quad 1}_{\binom{4}{2}=6} & \underbrace{0 \quad 0 \quad 0 \quad 1}_{\binom{4}{1}=4} \end{bmatrix}.$$

In the case that N=3, there may be layers of different types (3/2/1). For the layers each having an effective spreading factor (i.e., the number of columns where the elements are not 1) of 3, in the case of the minimum interference between the layers of an identical type, there may be three different patterns. For the layers each having an effective spreading factor of 2, in the case of the minimum interference between the layers of an identical type, there may be three different patterns. For the layers each having an effective spreading factor of 1, in the case of the minimum interference between the layers of an identical type, there is merely one pattern. In this way, it is able to achieve the pattern maximization.

For the application scenarios where N=2 or 4, the pattern maximization may be achieved on the basis of the situation where N=3, and thus a detailed description thereof will be omitted herein.

Alternatively, the plurality of pieces of data may belong to one user, or at least two users.

In the case that the plurality of pieces of data belongs to at least two users, the base station may divide at first N pieces of data for the at least two users into K layers, and then transmit the N pieces of data on M physical resources irrelevant to each other, where N>M. In addition, for the pieces of data in an identical layer, the number of the irrelevant physical resources occupied by each piece of data is the same and greater than the number of the irrelevant physical resources occupied by each piece of data in a next layer.

Because the base station divides the N pieces of data for the users into K layers and transmits them on the M physical resources, a transmission diversity order for the pieces of data in a current layer is smaller than that for the pieces of data in a previous layer. In the related art, the diversity order for the data flow based on a successive interference cancellation receiver is minimal in the first layer, and then increases layer by layer. However, based on the transmission mode in the embodiments of the present disclosure, the transmission diversity order for the data in the current layer is smaller than that for the data in the previous layer, and the transmission diversity order for the data in the first layer is maximal. As a result, after the detection of the successive interference cancellation receiver, the diversity order for the pieces of data in each layer is similar, so as to facilitate the demodulation of its own data by the user.

The transmission diversity order refers to the number of the irrelevant physical resources occupied by the data to be transmitted. The pieces of data carried by two irrelevant physical resources are irrelevant to each other. In the case that a plurality of pieces of data is carried by an identical physical resource, these pieces of data are relevant to each other. Usually, the pieces of the data are transmitted on an identical physical resource in a linearly-superposed manner.

Through power control, the number of the pieces of data to be transmitted on each physical resource may be greater than M, i.e., K may be greater than M. However, in the case that K>M, unnecessary resource waste may occur. Usually, in the case that K is smaller than or equal to M, it is able for the UE to demodulate its own data, so alternatively, the number of the pieces of data to be transmitted on each physical resource by the base station is not greater than M.

Alternatively, the base station may transmit M pieces of data on the physical resources with a certain granularity, so as to reduce the waste of resources and facilitate the demodulation of its own data by the users in an accurate manner.

At a receiving end, signal detection is carried out in a successive interference cancellation reception mode. A reception diversity order for a data stream in an $i^{th}$ layer based on the successive interference cancellation receiver may be calculated by the equation $N_{diversity}=N_R-N_T+i$, where $N_R$ represents a sum of the transmission diversity order and the number of receiving antennae for the data, and $N_T$ represents the number of transmitting antennae for the data.

During the detection for the successive interference cancellation, the diversity order for the detected data in the first layer is the minimal, so the diversity order for the detected data in the current layer may be incremented by 1 as compared with the diversity order for the detected data in the previous layer. In other words, the system performance based on the successive interference cancellation receiver depends on the accuracy of the interference cancellation in the first layer. Hence, the present disclosure provides in some embodiments a non-orthogonal transmission mode, and a basic principle for this mode is to enable the transmission diversity order for the data in the current layer to be greater than that for the data in the next layer, so as to ensure the similarity of the transmission diversity order for the pieces of data in each layer after the successive interference cancellation.

For the data streams, the physical resources may be irrelevant to each other in any one, two or more of frequency, space, time and etc.

Figure 3A:
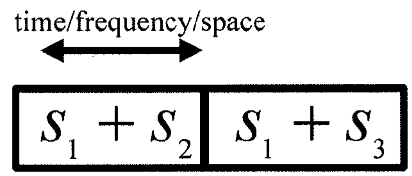
FIG. 3*a* is a schematic view showing the transmission of three pieces of data according to one embodiment of the present disclosure.

As shown in FIG. 3*a*, by taking three users and two irrelevant physical resources as an example, the data streams may be transmitted as follows:

$$[s_1, s_2, s_3,]\begin{bmatrix} 1 & 1 \\ 1 & 0 \\ 0 & 1 \end{bmatrix} = [s_1+s_2 \quad s_1+s_3].$$

A first and second symbols $s_1$ sequentially transmitted by user 1 are irrelevant to each other in time, frequency or space. In this way, it is able to acquire two diversity orders at the receiving end. For a Single Input Multiple Output (*SIMO*) system with a 1*2 mode, the diversity order for the symbol $s_1$ is 2 and has the highest reliability, so it may be demodulated by user 1 at first. At this time, the diversity order for the symbol $s_1$ after the detection based on the successive interference cancellation receiver is 4=2(2 symbols)+2(2 antennae)−1+1. After the first symbol $s_1$ has been demodulated, for users 2 and 3, the diversity orders for the symbols $s_2$ and $s_3$ after the detection are each 4=1(1 symbol)+2(2 antennae)−1+2.

For a system with multiple data streams, in the case that the reception diversity order for each data stream is the same, the corresponding transmission mode is relatively reliable. Similarly, it may be extended to the case of more than two data streams.

Figure 3B:
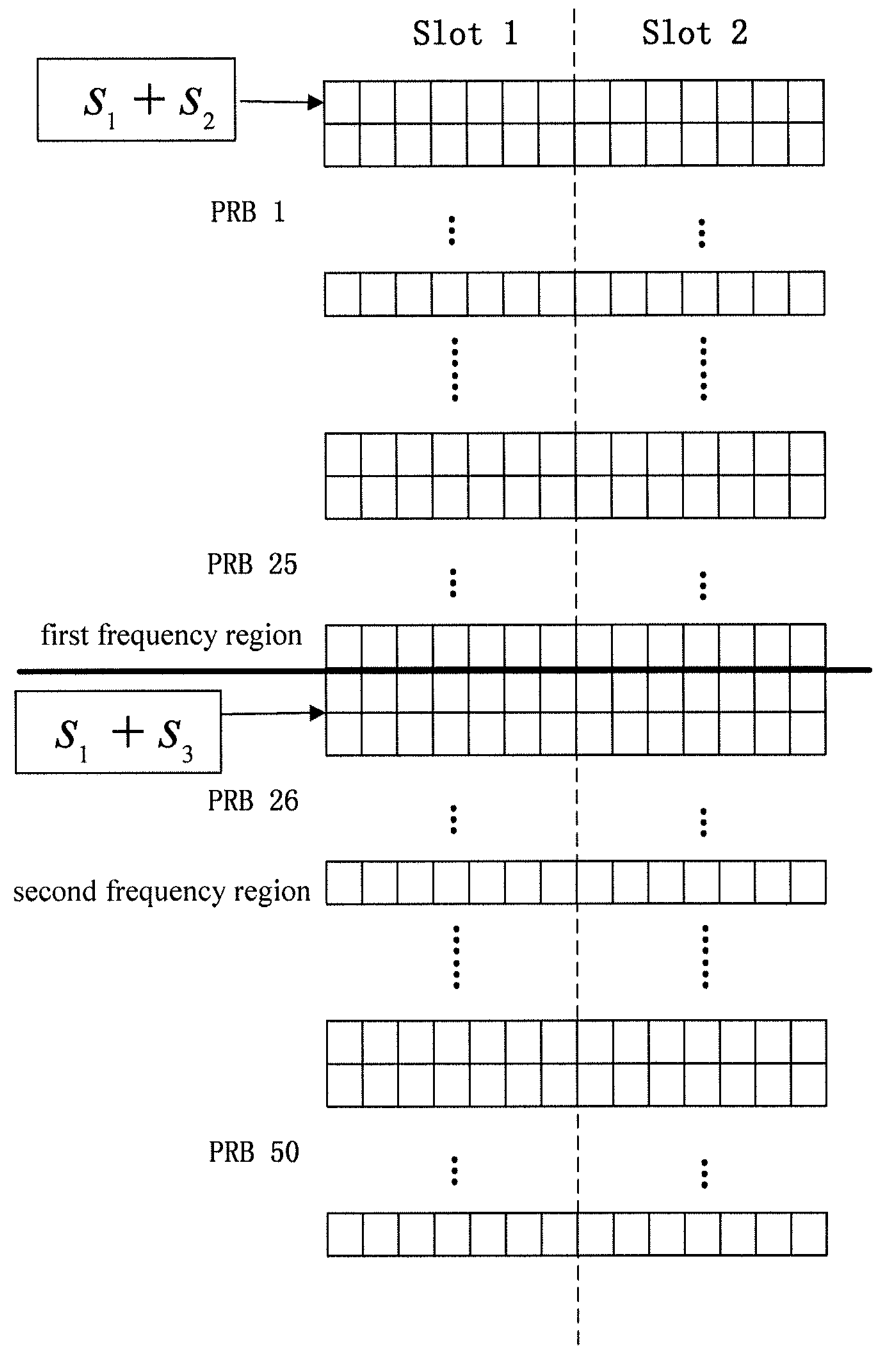
FIG. 3*b* is a schematic view showing the implementation of the transmission of three pieces of data in a Long-Term Evolution (LTE) system according to one embodiment of the present disclosure.

Taking the LTE system as an example, the pieces of data may be transmitted in a mode as shown in FIG. 3*b*. In FIG. 3*b*, a longitudinal direction represents a frequency domain, and a horizontal direction represents time. The pieces of data for users 1 and 2 are transmitted at a first frequency domain, and the pieces of data for users 1 and 3 are transmitted at a second frequency domain.

Figure 3C:
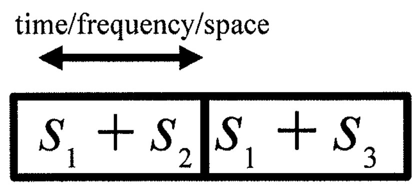
FIG. 3*c* is a schematic view showing the transmission of two pieces of data according to one embodiment of the present disclosure.

As shown in FIG. 3*c*, two orthogonal physical resources may also be used to transmit two pieces of data. At this time, the two pieces of data, i.e., S2 and S2', may be transmitted by user 2 on the two orthogonal physical resources respectively.

Figure 4:
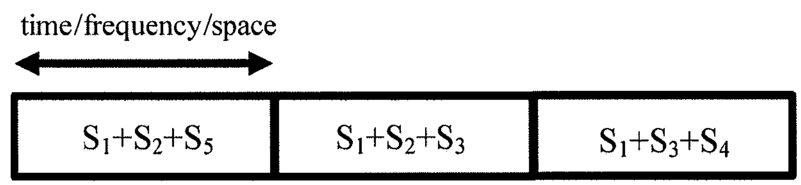
FIG. 4 is a schematic view showing the transmission of five pieces of data according to one embodiment of the present disclosure.

As shown in FIG. 4, in the case of five users and three orthogonal physical resources, the pieces of data may be transmitted as follows:

$$[s_1, s_2, s_3, s_4, s_5]\begin{bmatrix} 1 & 1 & 1 \\ 1 & 1 & 0 \\ 0 & 1 & 1 \\ 0 & 0 & 1 \\ 1 & 0 & 0 \end{bmatrix} = [s_1+s_2+s_5 \quad s_1+s_2+s_3 \quad s_1+s_2+s_4].$$

In other words, first, second and fifth pieces of data are transmitted on a first physical resource, first, second and third pieces of data are transmitted on a second physical resource, and first, third and fourth pieces of data are transmitted on a third physical resource. There exists the following relationship among the transmission diversity orders for the pieces of data for the users: user 1>user 2=user 3>user 4=user 5. In the case that there are three transmitting antennae and three receiving antennae, the reception diversity orders for the user may be $N_{div}^{s_1}=3+3-3+1=4$, $N_{div}^{s_2}=N_{div}^{s_3}=2+3-3+2=4$ and $N_{div}^{s_4}=N_{div}^{s_5}=1+3-3+3=4$.

The transmission mode in FIG. 4 may also be represented by the following matrix $$\begin{bmatrix} s_1 & s_2 & s_4 \\ s_2 & s_1 & s_3 \\ s_3 & s_3 & s_1 \end{bmatrix}.$$

In the case that N pieces of data are transmitted on M irrelevant physical resources, the base station may transmit the pieces of data as follows:

$$[s_1, s_2, \ldots, s_N]\begin{bmatrix} 1 & 1 & 1 & \ldots & 1 \\ 0 & 1 & 1 & \ldots & 1 \\ 1 & 1 & 0 & \ldots & \vdots \\ 0 & \vdots & 1 & \ldots & 1 \\ 1 & \vdots & 1 & \ldots & \vdots \\ \vdots & \vdots & \vdots & \ldots & \vdots \\ 1 & \vdots & \vdots & \ldots & \vdots \\ 0 & \vdots & \vdots & \ldots & 1 \end{bmatrix} = [s_1 + s_3 + s_5 + \ldots + s_{N-1},$$

$$s_1 + s_2 + s_3 + \cdots + s_{N-2}, s_1 + s_2 + s_4 + \ldots +, \ldots, s_1 + s_2 + s_4 + \ldots + s_N],$$

where $S_1$ to $S_N$ represent the N pieces of data respectively, and $$G = \begin{bmatrix} 1 & 1 & 1 & \ldots & 1 \\ 0 & 1 & 1 & \ldots & 1 \\ 1 & 1 & & \ldots & \vdots \\ 0 & \vdots & 1 & \ldots & 1 \\ 1 & \vdots & 1 & \ldots & \vdots \\ \vdots & \vdots & \vdots & \ldots & \vdots \\ 1 & \vdots & \vdots & \ldots & \vdots \\ 0 & \vdots & \vdots & \ldots & 1 \end{bmatrix}$$

represents a matrix for an N*M non-orthogonal transmission mode. In the matrix G, the number of element "1" in each row corresponding to the pieces of data in an identical layer is the same, and the number of element "1" in each row is marked as $n_1$, $n_2$, $n_3$, . . . , $n_N$ respectively, where $n_1 \geq n_2 \geq n_3 \geq \ldots \geq n_N$.

Alternatively, the pieces of data may be divided into layers and transmitted as follows:

layerLayerLayer 1, 2 … K $$\left[\boxed{s_1}, \boxed{s_2, s_3}, \ldots, \boxed{s_N}\right]\begin{bmatrix} 1 & 1 & 1 & \ldots & 1 \\ 0 & 1 & 1 & \ldots & 1 \\ 1 & 1 & & \ldots & \vdots \\ 0 & \vdots & 1 & \ldots & 1 \\ 1 & \vdots & 1 & \ldots & \vdots \\ \vdots & \vdots & \vdots & \ldots & \vdots \\ 1 & \vdots & \vdots & \ldots & \vdots \\ 0 & \vdots & \vdots & \ldots & 1 \end{bmatrix} =$$

} row weight $n_1$: pieces of data in layer 1 being transmitted on $n_1$ different physical resources } row weight $n_2 = n_3$: pieces of data in layer 2 being transmitted on $n_2$ different physical resources

⋮

} row weight $n_N$: pieces of data in layer K being transmitted on $n_N$ different physical resources $$[s_1 + s_3 + s_5 + \ldots + s_{N-1}, s_1 + s_2 + s_3 + \ldots + s_{N-1}, s_1 + s_2 + s_4 + \ldots +, s_1 + s_2 + s_4 + \ldots + s_N]$$

Here, the row weight represents the number of element "1" in the row, and the row weight is equal to the number of the physical resources occupied by the corresponding data to be transmitted. At this time, $n_1 > n_2 = n_3 \geq \ldots \geq n_N$.

Alternatively, in the case that K=M, the transmission mode may also be represented by the following M-dimensional matrix:

$$\begin{bmatrix} s_1 & s_2 & s_4 & \ldots & s_N \\ s_3 & s_1 & s_2 & \ldots & \ldots \\ s_5 & s_3 & s_1 & \ldots & s_4 \\ \ldots & \ldots & \ldots & \ldots & s_2 \\ s_{N-1} & \ldots & s_5 & s_3 & s_1 \end{bmatrix}.$$

At this time, a sum $s_1+s_2+s_4+ \ldots +s_N$ of the pieces of data in a first row may be transmitted on a first physical resource, a sum $s_3+s_1+s_2+ \ldots +s_{N-2}$ of the pieces of data in a second row may be transmitted on a second physical resource, . . . , and a sum $s_{N-1}+ \ldots +s_5+s_3+s_1$, of the pieces of data in an $M^{th}$ row may be transmitted on an $M^{th}$ physical resource. Alternatively, a sum $s_1+s_3+s_5+ \ldots +s_{N-1}$ of the pieces of data in a first column may be transmitted on the first physical resource, a sum $s_2$ $s_1+s_3+ \ldots +s_{N-3}$ of the pieces of data in a second column may be transmitted on the second physical resource, . . . , and a sum $s_N+ \ldots +s_4+s_2+s_1$ of the pieces of data in an $M^{th}$ column may be transmitted on the $M^{th}$ physical resource.

Figure 5:
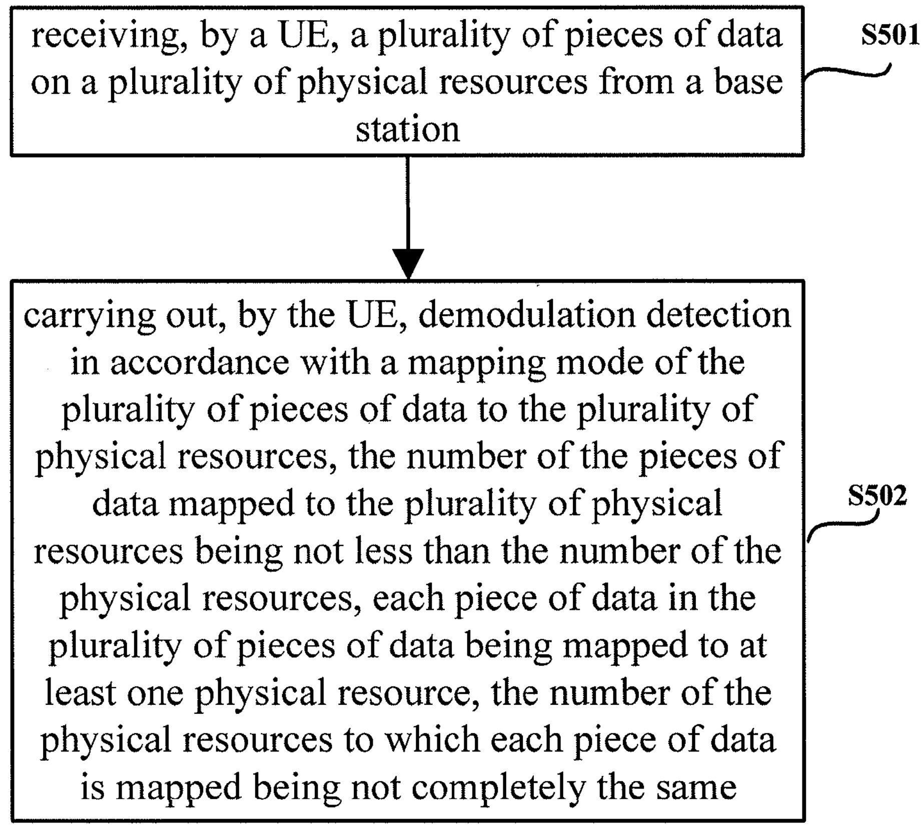
FIG. 5 is a flow chart of a data reception and detection method according to one embodiment of the present disclosure.

The present disclosure further provides in some embodiments a data reception and detection method which, as shown in FIG. 5, includes: Step S501 of receiving, by a UE, a plurality of pieces of data on a plurality of physical resources from a base station; and Step S502 of carrying out, by the UE, demodulation detection in accordance with a mapping mode of the plurality of pieces of data to the plurality of physical resources, the number of the pieces of data mapped to the plurality of physical resources being not less than the number of the physical resources, each piece of data in the plurality of pieces of data being mapped to at least one physical resource, the number of the physical resources to which each piece of data is mapped being not completely the same.

Through power control, the number of the pieces of data to be transmitted on each physical resource may be greater than the number of the physical resources. However, in the embodiments of the present disclosure, the number of the pieces of data mapped to each physical resource is not greater than the number of the physical resources, so as to prevent the waste of resources.

Alternatively, the pieces of data mapped to an identical physical resource are transmitted on an identical physical resource in a superposed manner, i.e., the pieces of data mapped to an identical physical resource are superposed and then transmitted on the physical resource. Alternatively, the pieces of data are superposed linearly.

Alternatively, during the mapping, the plurality of pieces of data may be divided into a plurality of layers, and the number of the physical resources to which each piece of data in a previous layer is mapped is greater than the number of the physical resources to which each piece of data in a current layer is mapped. Further, the number of the physical resources to which any one of the pieces of data in an identical layer is mapped may be same as the number of the physical resources to which any other one of the pieces of data in the identical layer is mapped. Alternatively, the pieces of data which are in the layers of an identical type and belong to different users are overlapped to the minimum degree, and the layers of different types are subjected to pattern maximization treatment.

Alternatively, the layers of an identical type which have different equivalent spreading factors (i.e., the number of elements, each of which is not 0) may be subjected to pattern maximization treatment, and the layers of an identical type which have an identical equivalent spreading factor may be subjected to interference minimization treatment.

Alternatively, the plurality of pieces of data may belong to one user, or at least two users. The UE may acquire its own data after the demodulation detection.

Alternatively, the UE carries out the demodulation detection in a successive interference cancellation reception mode. Usually, a successive interference cancellation reception technique refers to the demodulation of the pieces of data layer by layer. A demodulation and detection result for the pieces of data in the current layer is used for the interference cancellation for the pieces of data in the next layer, and the pieces of data in the current layer may be detected in accordance with the data interference-free result for the pieces of the data in the previous layer obtained after the interference cancellation.

Alternatively, the UE preferentially detects the data in the layer where the number of the physical resources to which each data is mapped is large.

Figure 6:
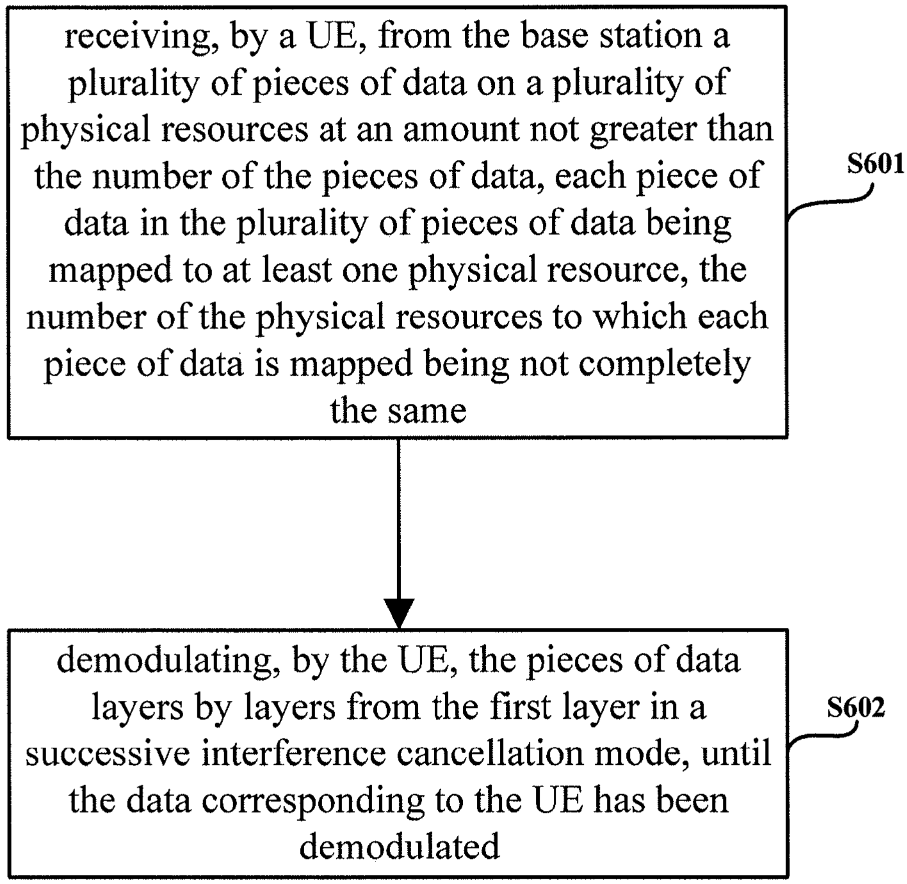
FIG. 6 is another flow chart of the data reception and detection method according to one embodiment of the present disclosure.

As shown in FIG. 6, in an alternative embodiment, the data reception and detection method includes: Step S601 of receiving, by the UE, from the base station a plurality of pieces of data on a plurality of physical resources at an amount not greater than the number of the pieces of data, each piece of data in the plurality of pieces of data being mapped to at least one physical resource, the number of the physical resources to which each piece of data is mapped being not completely the same; and Step S602 of demodulating, by the UE, the pieces of data layers by layers from the first layer in a successive interference cancellation mode, until the data corresponding to the UE has been demodulated.

Alternatively, Step S601 includes receiving, by the UE, from the base station N pieces of data transmitted on M orthogonal physical resources and to at least two users, where M<N. In addition, the following conditions may be satisfied. The N pieces of data are divided into K layers, and then transmitted on M physical resources irrelevant to each other. Further, for the pieces of data in an identical layer, the number of the irrelevant physical resources occupied by each piece of data is the same, and the number of the irrelevant physical resources occupied by each piece of data in the current layer is greater than the number of the irrelevant physical resources occupied by each piece of data in the next layer.

In the case that the pieces of data in the layers are demodulated sequentially from the first layer, it is able to reduce the average computation complexity for the users.

In the case of three users and two orthogonal physical resources as shown in FIG. 3*a*, the signals received by the user 1 include $$y_{11}=h_{11}(s_1+s_2)+n_{11}$$

$y_{12}=h_{12}(s_1+s_3)+n_{12}$, where $h_{11}$ represents a channel matrix experienced by a first half of the symbols, and $h_{12}$ represents a channel matrix experienced by a second half of the symbols.

During the detection by user 1, $s_2$ and $s_3$ are taken as interference signals. At first, the received signals are subjected to normalization treatment by the user 1. Then, user 1 may acquire $s_1+s_2$ and $s_1+s_3$ through a Minimum Mean Square Error (MMSE) algorithm, and determine log-likelihood ratios $LLR_1(s_1)$ and $LLR_2(s_1)$ for the symbol $s_1$. Finally, user 1 may perform soft demodulation using $LLR_1(s_1)+LLR_2(s_1)$ so as to acquire $\hat{s}_1$.

For user 2, the signals received by the user 2 include $$y_{21}=h_{21}(s_1+s_2)+n_{21}$$

$$y_{22}=h_{22}(s_1+s_3)+n_{22}.$$

User 2 may obtain its own data by detecting the symbol $s_1$ to acquire $\hat{s}_1$, and then deleting $\hat{s}_1$ from $\hat{s}$, so as to acquire $\hat{s}_2$.

At first, the received signals are subjected to normalization by user 2, and $s_1+s_2$ and $s_1+s_3$ are marked as T(1) and T(2) respectively. Then, through the MMSE algorithm, user 2 may acquire $$\hat{T}(1) = W_{mmse1}y_{21} = \tilde{s}_1 + W_{mmse1}n_{21},$$

$$\hat{T}(2) = W_{mmse2}y_{22} = \tilde{s}_1 + W_{mmse2}n_{22},$$

$$W_{mmse1} = \frac{h_{21}^*}{|h_{21}|^2 + \sigma_1^2}, \quad \text{and}$$

$$W_{mmse2} = \frac{h_{22}^*}{|h_{22}|^2 + \sigma_2^2}.$$

Then, user 2 may determine log-likelihood ratios $LLR_1(T(1))$ and $LLR_2(T(2))$ for T(1) and T(2), respectively, and perform soft demodulation using $LLR_1(T(1))+LLR_2(T(2))$, so as to acquire $\hat{s}_1$.

Next, user 2 may decode $\hat{s}_1$ using a Turbo decoding technique (which may be used to improve the reliability of each bit), and then perform soft demodulation on the decoded $\hat{s}_1$ to acquire a soft-demodulation symbol $\check{s}_1$.

Then, user 2 may perform the interference cancellation, and substitute the resultant $\check{s}_1$ into $\hat{s}_1+\hat{s}_2$, so as to acquire $\hat{s}_2$: $\hat{s}_2=W_{mmse}y_{21}-\check{s}_1$.

For user 3, the signals received by the user 3 include $$y_{31}=h_{31}(s_1+s_2)+n_{31}$$

$$y_{32}=h_{32}(s_1+s_3)+n_{32}.$$

Identical to the above steps for user 2, user 3 may substitute the resultant $\check{s}_1$ into $\hat{s}_1+\hat{s}_3$, so as to acquire $\hat{s}_3$: $\hat{s}_3=w_{mmse3}y_{32}-\check{s}_1$, where $$w_{mmse3} = \frac{h_{32}^*}{|h_{32}|^2 + \sigma_3^2}.$$

Then, user 3 may decode $\hat{s}_3$ using the Turbo decoding technique, so as to acquire $\tilde{s}_3$.

Figure 7:
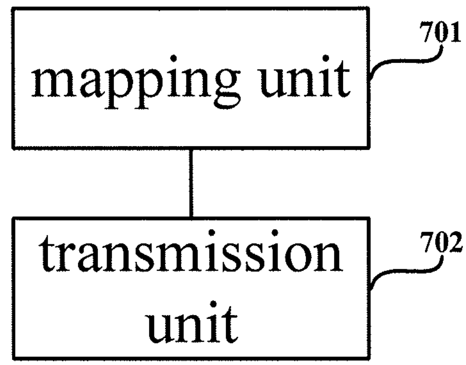
FIG. 7 is a schematic view showing a base station according to one embodiment of the present disclosure.

The present disclosure further provides in some embodiments a base station which, as shown in FIG. 7, includes: a mapping unit 701 configured to map a plurality of pieces of data to physical resources at an amount not greater than the number of the pieces of data, each piece of data in the plurality of pieces of data being mapped to at least one physical resource, the number of the physical resources to which each piece of data is mapped being not completely the same; and a transmission unit 702 configured to transmit the plurality of pieces of data on the physical resources.

Alternatively, the number of the pieces of data mapped to each physical resource is not greater than the number of the physical resources.

Alternatively, the pieces of data mapped to an identical physical resource are superposed and then transmitted on the physical resource.

Alternatively, the pieces of data are superposed linearly.

Alternatively, the plurality of pieces of data may be divided into a plurality of layers, and the number of the physical resources to which each piece of data in a previous layer is mapped is greater than the number of the physical resources to which each piece of data in a current layer is mapped. Alternatively, the pieces of data which are in the layers of an identical type and belong to different users are overlapped to the minimum degree, and the layers of different types are subjected to pattern maximization treatment.

Alternatively, the layers of an identical type which have different equivalent spreading factors (i.e., the number of elements, each of which is not 0) may be subjected to pattern maximization treatment, and the layers of an identical type which have an identical equivalent spreading factor may be subjected to interference minimization treatment.

Alternatively, the number of the physical resources to which any one of the pieces of data in an identical layer is mapped is the same as the number of the physical resources to which any other one of the pieces of data in the identical layer is mapped.

Alternatively, the plurality of pieces of data belongs to at least two users.

Figure 8:
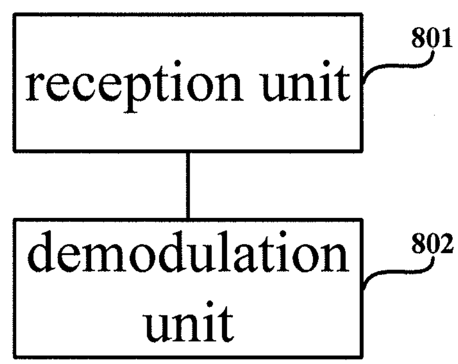
FIG. 8 is a schematic view showing a UE according to one embodiment of the present disclosure.

The present disclosure further provides in some embodiments a UE which, as shown in FIG. 8, includes: a reception unit 801 configured to receive a plurality of pieces of data on a plurality of physical resources from a base station; and a demodulation unit 802 configured to carry out demodulation detection in accordance with a mapping mode of the plurality of pieces of data to the plurality of physical resources, the number of the pieces of data mapped to the plurality of physical resources being not less than the number of the physical resources, each piece of data in the plurality of pieces of data being mapped to at least one physical resource, the number of the physical resources to which each piece of data is mapped being not completely the same.

Alternatively, the number of the pieces of data mapped to each physical resource is not greater than the number of the physical resources.

Alternatively, the pieces of data mapped to an identical physical resource are superposed and then transmitted on the physical resource.

Alternatively, the pieces of data are superposed linearly.

Alternatively, the plurality of pieces of data is divided into a plurality of layers, and the number of the physical resources to which each piece of data in a previous layer is mapped is greater than the number of the physical resources to which each piece of data in a current layer is mapped. Alternatively, the pieces of data which are in the layers of an identical type and belong to different users are overlapped to the minimum degree, and the layers of different types are subjected to pattern maximization treatment.

Alternatively, the layers of an identical type which have different equivalent spreading factors (i.e., the number of elements, each of which is not 0) may be subjected to pattern maximization treatment, and the layers of an identical type which have an identical equivalent spreading factor may be subjected to interference minimization treatment.

Alternatively, the number of the physical resources to which any one of the pieces of data in an identical layer is mapped is the same as the number of the physical resources to which any other one of the pieces of data in the identical layer is mapped.

Alternatively, the plurality of pieces of data belongs to at least two users, and the UE acquires its own data after the demodulation detection.

Alternatively, the UE carries out the demodulation detection in a successive interference cancellation mode.

Alternatively, the UE preferentially detects the data in the layer where the number of the physical resources to which each data is mapped is large.

The present disclosure further provides in some embodiments a base station which includes: a processor configured to map a plurality of pieces of data to physical resources at an amount not greater than the number of the pieces of data, and transmit the data under the control of the processor, each piece of data in the plurality of pieces of data being mapped to at least one physical resource, the number of the physical resources to which each piece of data is mapped being not completely the same.

The base station may be further configured to achieve the other functions mentioned in the data transmission method.

During the data transmission, the base station may be implemented through a transceiver module and a radio interface.

The present disclosure further provides in some embodiments a UE which includes: a processor configured to receive, by the transceiver, a plurality of pieces of data on a plurality of physical resources from a base station, and carry out demodulation detection in accordance with a mapping mode of the plurality of pieces of data to the plurality of physical resources, the number of the pieces of data mapped to the plurality of physical resources being not less than the number of the physical resources, each piece of data in the plurality of pieces of data being mapped to at least one physical resource, the number of the physical resources to which each piece of data is mapped being not completely the same.

The UE may be further configured to achieve the other functions mentioned in the data transmission method.

During the data reception, the UE may be implemented through a transceiver module and a radio interface.

Figure 9:
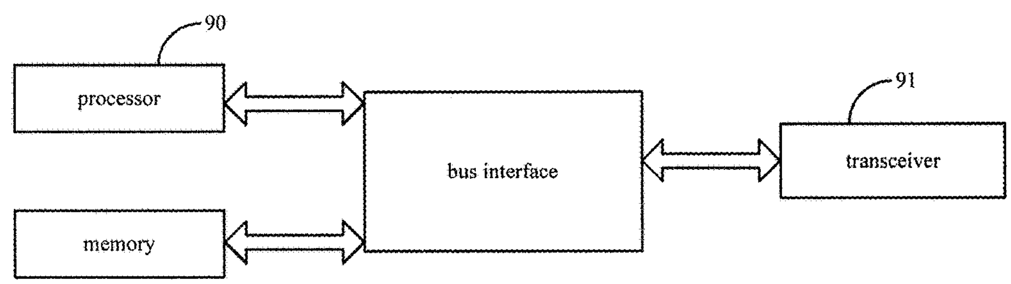
FIG. 9 is another schematic view showing the base station according to one embodiment of the present disclosure.

The present disclosure further provides a base station which, as shown in FIG. 9, includes: a processor 90 configured to read a program stored in a memory so as to map a plurality of pieces of data to physical resources at an amount not greater than the number of the pieces of data, and transmit the pieces of data on the physical channels by a transceiver 91, each piece of data in the plurality of pieces of data being mapped to at least one physical resource, the number of the physical resources to which each piece of data is mapped being not completely the same; and the transceiver 91 configured to receive and transmit the data under the control of the processor.

Because the number of the physical resources on which the pieces of data are transmitted is smaller than the number of the pieces of data, so it is able to improve the data transmission capability for the communication system.

Alternatively, the number of the pieces of data mapped to each physical resource by the processor is not greater than the number of the physical resources, so as to prevent the waste of resources.

Alternatively, the transceiver 91 is further configured to superpose and transmit the pieces of data mapped to an identical physical resource.

Alternatively, the transceiver 91 is further configured to superpose the pieces of data linearly.

Alternatively, the processor 90 is further configured to divide the plurality of pieces of data into a plurality of layers, the number of the physical resources to which each piece of data in a previous layer is mapped is greater than the number of the physical resources to which each piece of data in a current layer is mapped, the pieces of data which are in the layers of an identical type and belong to different users are overlapped to the minimum degree, and the layers of different types are subjected to pattern maximization treatment.

Alternatively, the layers of an identical type which have different equivalent spreading factors (i.e., the number of elements, each of which is not 0) are subjected to pattern maximization treatment, and the layers of an identical type which have an identical equivalent spreading factor are subjected to interference minimization treatment.

Alternatively, the processor is further configured to map the pieces of data in an identical layer to the physical resources at an identical amount.

Alternatively, the plurality of pieces of data belongs to at least two users.

In FIG. 9, a bus architecture may include a number of buses and bridges connected to each other, so as to connect various circuits for one or more processors such as the processor 90 and one or more memories. In addition, as is known in the art, the bus architecture may be used to connect any other circuits, such as a circuit for a peripheral device, a circuit for a voltage stabilizer and a power management circuit, which will not be further elaborated herein. Bus interfaces are provided, and the transceiver 91 may consist of more than one elements, e.g., a transmitter and a receiver for communication with any other devices over a transmission medium. The processor 90 takes charge of managing the bus architecture as well as general processing. The memory may store therein data desired for the operation of the processor 90.

Figure 10:
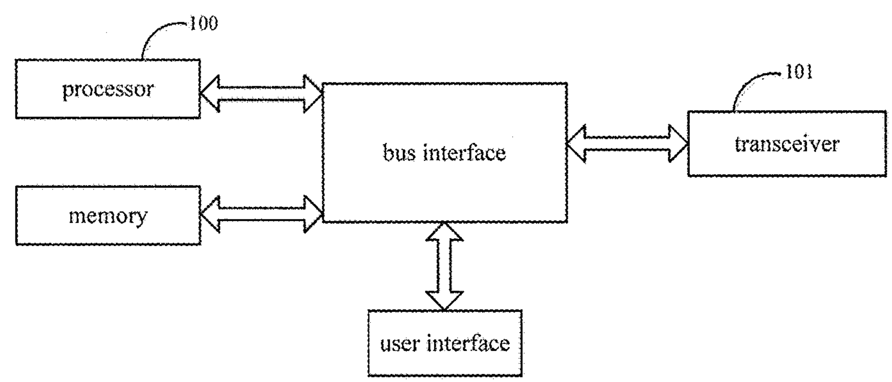
FIG. 10 is another schematic view showing the UE according to one embodiment of the present disclosure.

The present disclosure further provides in some embodiments a UE which, as shown in FIG. 10, includes: a transceiver 101 configured to receive and transmit data under the control of a processor 100; and the processor 100 configured to read a program stored in a memory so as to receive, by the transceiver 101, a plurality of pieces of data on a plurality of physical resources from a base station, and carry out demodulation detection in accordance with a mapping mode of the plurality of pieces of data to the plurality of physical resources, the number of the pieces of data mapped to the plurality of physical resources being not less than the number of the physical resources, each piece of data in the plurality of pieces of data being mapped to at least one physical resource, the number of the physical resources to which each piece of data is mapped being not completely the same.

Because the number of the physical resources on which the pieces of data are transmitted is smaller than the number of the pieces of data, so it is able to improve the data transmission capability for the communication system.

Alternatively, the number of the pieces of data mapped to each physical resource is not greater than the number of the physical resources, so as to prevent the waste of resources.

Alternatively, the pieces of data mapped to an identical physical resource are superposed and then transmitted on the physical resource.

Alternatively, the pieces of data are superposed linearly.

Alternatively, the plurality of pieces of data is divided into a plurality of layers, the number of the physical resources to which each piece of data in a previous layer is mapped is greater than the number of the physical resources to which each piece of data in a current layer is mapped, the pieces of data which are in the layers of an identical type and belong to different users are overlapped to the minimum degree, and the layers of different types are subjected to pattern maximization treatment.

Alternatively, the layers of an identical type which have different equivalent spreading factors (i.e., the number of elements, each of which is not 0) are subjected to pattern maximization treatment, and the layers of an identical type which have an identical equivalent spreading factor are subjected to interference minimization treatment.

Alternatively, the number of the physical resources to which any one of the pieces of data in an identical layer is mapped is the same as the number of the physical resources to which any other one of the pieces of data in the identical layer is mapped.

Alternatively, the plurality of pieces of data belongs to at least two users, and the transceiver acquires the data after the demodulation detection.

Alternatively, the transceiver 101 carries out the demodulation detection in a successive interference cancellation mode.

Alternatively, the processor preferentially detects the data in the layer where the number of the physical resources to which each data is mapped is large.

In FIG. 10, a bus architecture may include a number of buses and bridges connected to each other, so as to connect various circuits for one or more processors such as the processor 100 and one or more memories. In addition, as is known in the art, the bus architecture may be used to connect any other circuits, such as a circuit for a peripheral device, a circuit for a voltage stabilizer and a power management circuit which will not be further elaborated herein. Bus interfaces are provided, and the transceiver 101 may consist of more than one elements, e.g., a transmitter and a receiver for communication with any other devices over a transmission medium. With respect to different UEs, a user interface may also be provided for devices which are to be arranged inside or outside the UE, and these devices may include but not limited to a keypad, a display, a speaker, a microphone and a joystick. The processor 100 takes charge of managing the bus architecture as well as general processing. The memory may store therein data desired for the operation of the processor 100.

According to the data transmission method, the data reception and detection method, the base station and the UE on the basis of a non-orthogonal mode in the embodiments of the present disclosure, before the transmission of the pieces of data on the physical resources by the base station, the plurality of pieces of data is firstly mapped to the physical resources at an amount not greater than the number of the pieces of data, each piece of data in the plurality of pieces of data is mapped to at least one physical resource, and the number of the physical resources to which each piece of data is mapped is not completely the same. Then, the pieces of data on the physical resources are transmitted. As a result, it is able to transmit more pieces of data through fewer physical resources, thereby to improve the data transmission capability for the communication system.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, Compact Disc Read-Only Memory (CD-ROM) and optical memory) including computer-readable program codes.

The present disclosure is described with reference to the flow charts and/or block diagrams showing the method, device (system) and computer program product according to the embodiments of the present disclosure. It should be appreciated that each process and/or block, or combinations thereof, in the flow charts and/or block diagrams may be implemented via computer program commands. These computer program commands may be applied to a general-purpose computer, a special-purpose computer, an embedded processor or any other processor of programmable data processing equipment, so as to form a machine, thereby to obtain the means capable of effecting the functions specified in one or more processes in the flow charts and/or one or more blocks in the block diagrams in accordance with the commands executed by the processor of the computer or the other programmable data processing equipment.

These computer program commands may also be stored in a computer-readable memory capable of guiding the computer or the other programmable data processing equipment to work in a special manner, so as to form a product including a command device capable of effecting the functions specified in one or more processes in the flow charts and/or one or more blocks in the block diagrams.

These computer program commands may also be loaded onto a computer or the other programmable data processing equipment, so as to perform a series of operations thereon and generate the processing implemented by the computer, thereby to provide the steps capable of effecting the functions specified one or more processes in the flow charts and/or one or more blocks in the block diagrams in accordance with the instructions.

Although the preferred embodiments are described above, a person skilled in the art may make modifications and alterations to these embodiments in accordance with the basic concept of the present disclosure. So, the attached claims are intended to include the preferred embodiments and all of the modifications and alterations that fall within the scope of the present disclosure.

Obviously, a person skilled in the art may make further modifications and improvements without departing from the principle/spirit of the present disclosure, and these modifications and improvements shall also fall within the scope of the present disclosure.

What is claimed is:

1. A data transmission method, comprising steps of:

mapping a plurality of pieces of data to physical resources at an amount not greater than the number of the pieces of data, each piece of data in the plurality of pieces of data being mapped to at least one physical resource, the number of the physical resources to which each piece of data is mapped being not completely the same; and transmitting the plurality of pieces of data on the physical resources, wherein the number of the pieces of data mapped to each physical resource is not greater than the number of the physical resources, the pieces of data mapped to an identical physical resource are linearly superposed and then transmitted on the physical resources, the plurality of pieces of data is divided into a plurality of layers, and the number of the physical resources to which each piece of data in a previous layer is mapped is greater than the number of the physical resources to which each piece of data in a current layer is mapped.

2. The data transmission method according to claim 1, wherein the pieces of data which are in the layers of an identical type and belong to different users are overlapped to the minimum degree, and the layers of different types are subjected to pattern maximization treatment.

3. The data transmission method according to claim 2, further comprising steps of:

subjecting the layers of an identical type which have different equivalent spreading factors to pattern maximization treatment, and subjecting the layers of an identical type which have an identical equivalent spreading factor to interference minimization treatment.

4. The data transmission method according to claim 2, wherein the number of the physical resources to which any one of the pieces of data in an identical layer is mapped is the same as the number of the physical resources to which any other one of the pieces of data in the identical layer is mapped.

5. The data transmission method according to claim 1, wherein the plurality of pieces of data belongs to at least two users.

6. A data reception and detection method, comprising steps of:

receiving, by a User Equipment (UE), a plurality of pieces of data on a plurality of physical resources from a base station; and carrying out, by the UE, demodulation detection in accordance with a mapping mode of the plurality of pieces of data to the plurality of physical resources, the number of the pieces of data mapped to the plurality of physical resources being not less than the number of the physical resources, each piece of data in the plurality of pieces of data being mapped to at least one physical resource, the number of the physical resources to which each piece of data is mapped being not completely the same, wherein the number of the pieces of data mapped to each physical resource is not greater than the number of the physical resources, the pieces of data mapped to an identical physical resource are linearly superposed and then transmitted, the plurality of pieces of data is divided into a plurality of layers, and the number of the physical resources to which each piece of data in a previous layer is mapped is greater than the number of the physical resources to which each piece of data in a current layer is mapped.

7. The data reception and detection method according to claim 6, wherein the pieces of data which are in the layers of an identical type and belong to different users are overlapped to the minimum degree, and the layers of different types are subjected to pattern maximization treatment.

8. The data reception and detection method according to claim 7, further comprising steps of:

subjecting the layers of an identical type which have different equivalent spreading factors to pattern maximization treatment, and subjecting the layers of an identical type which have an identical equivalent spreading factor to interference minimization treatment.

9. The data reception and detection method according to claim 7, wherein the number of the physical resources to which any one of the pieces of data in an identical layer is mapped is the same as the number of the physical resources to which any other one of the pieces of data in the identical layer is mapped.

10. The data reception and detection method according to claim 6, wherein the plurality of pieces of data belongs to at least two users, the UE acquires its own data after the demodulation detection, and the UE carries out the demodulation detection in a successive interference cancellation mode.

11. The data reception and detection method according to claim 7, wherein the UE preferentially detects the data in the layer where the number of the physical resources to which each data is mapped is large.

12. A base station, comprising:

a processor configured to read a program stored in a memory so as to map a plurality of pieces of data to physical resources at an amount not greater than the number of the pieces of data, each piece of data in the plurality of pieces of data being mapped to at least one physical resource, the number of the physical resources to which each piece of data is mapped being not completely the same; and transmit the pieces of data on the physical resources by a transceiver; and the transceiver configured to receive and transmit the data under the control of the processor, wherein the number of the pieces of data mapped to each physical resource is not greater than the number of the physical resources, the processor is further configured to divide the plurality of pieces of data into a plurality of layers, the number of the physical resources to which each piece of data in a previous layer is mapped is greater than the number of the physical resources to which each piece of data in a current layer is mapped, and the transceiver is further configured to linearly superpose and transmit the pieces of data mapped to an identical physical resource.

13. The base station according to claim 12, wherein the pieces of data which are in the layers of an identical type and belong to different users are overlapped to the minimum degree, and the layers of different types are subjected to pattern maximization treatment.

14. The base station according to claim 13, wherein the layers of an identical type which have different equivalent spreading factors are subjected to pattern maximization treatment, and the layers of an identical type which have an identical equivalent spreading factor are subjected to interference minimization treatment.

15. The base station according to claim 13, wherein the number of the physical resources to which any one of the pieces of data in an identical layer is mapped is the same as the number of the physical resources to which any other one of the pieces of data in the identical layer is mapped.

16. The base station according to claim 12, wherein the plurality of pieces of data belongs to at least two users.

17. A User Equipment (UE), comprising:

a transceiver configured to receive and transmit data under the control of a processor; and the processor configured to read a program stored in a memory so as to receive, by the transceiver, a plurality of pieces of data on a plurality of physical resources from a base station, and carry out demodulation detection in accordance with a mapping mode of the plurality of pieces of data to the plurality of physical resources, the number of the pieces of data mapped to the plurality of physical resources being not less than the number of the physical resources, each piece of data in the plurality of pieces of data being mapped to at least one physical resource, the number of the physical resources to which each piece of data is mapped being not completely the same, wherein the number of the pieces of data mapped to each physical resource is not greater than the number of the physical resources, the pieces of data mapped to an identical physical resource are linearly superposed and then transmitted, the plurality of pieces of data is divided into a plurality of layers, and the number of the physical resources to which each piece of data in a previous layer is mapped is greater than the number of the physical resources to which each piece of data in a current layer is mapped.

18. The UE according to claim 17, wherein, the pieces of data which are in the layers of an identical type and belong to different users are overlapped to the minimum degree, and the layers of different types are subjected to pattern maximization treatment.

19. The UE according to claim 18, wherein the layers of an identical type which have different equivalent spreading factors are subjected to pattern maximization treatment, and the layers of an identical type which have an identical equivalent spreading factor are subjected to interference minimization treatment.

20. The UE according to claim 18, wherein the number of the physical resources to which any one of the pieces of data in an identical layer is mapped is the same as the number of the physical resources to which any other one of the pieces of data in the identical layer is mapped.

21. The UE according to claim 17, wherein the plurality of pieces of data belongs to at least two users, the transceiver acquires its own data after the demodulation detection, and the transceiver carries out the demodulation detection in a successive interference cancellation mode.

22. The UE according to claim 18, wherein the processor preferentially detects the data in the layer where the number of the physical resources to which each data is mapped is large.

* * * * *